United States Patent [19]
Hjalmtysson

[11] Patent Number: 6,125,389
[45] Date of Patent: Sep. 26, 2000

[54] APPARATUS AND METHOD FOR PROVIDING NETWORK SUBSCRIBER SERVICES

[75] Inventor: Gisli Hjalmtysson, Gillette, N.J.

[73] Assignee: AT&T Corporation, New York, N.Y.

[21] Appl. No.: 08/933,494

[22] Filed: Sep. 18, 1997

[51] Int. Cl.[7] .................................................. G06F 15/177
[52] U.S. Cl. .......................... 709/221; 709/217; 709/219; 709/203
[58] Field of Search ..................................... 379/201, 207; 380/25; 709/224, 223, 203, 217, 219, 221

[56] References Cited

U.S. PATENT DOCUMENTS

| | | | |
|---|---|---|---|
| 5,191,611 | 3/1993 | Lang | 380/25 |
| 5,469,500 | 11/1995 | Satter et al. | 379/201 |
| 5,583,920 | 12/1996 | Wheeler, Jr. | 379/88 |
| 5,640,505 | 6/1997 | Hearn et al. | 379/201 |
| 5,703,940 | 12/1997 | Sattar et al. | 379/201 |
| 5,796,952 | 8/1998 | Davis et al. | 709/224 |
| 5,915,093 | 6/1999 | Berlin et al. | 709/219 |

*Primary Examiner*—Zarni Maung
*Assistant Examiner*—Patrice Winder
*Attorney, Agent, or Firm*—Kenyon & Kenyon

[57] ABSTRACT

An apparatus and method for providing subscriber services in a telecommunications network is provided. A portable subscriber services card includes a magnetic storage medium on a portion of the card on which is stored data associated with the subscriber and programming code that is utilized to implement the particular subscriber service. A network interface is provided to download the data and programming code stored on the subscriber services card to the telecommunications network during session initiation with the telecommunications network. The data and code that are downloaded to the network is processed by the network by utilizing the inherent processing capability of the network to provide the particular service to the subscriber.

15 Claims, 2 Drawing Sheets

APPARATUS AND METHOD FOR PROVIDING NETWORK SUBSCRIBER SERVICES

BACKGROUND OF THE INVENTION

The present invention relates to an apparatus and method for introducing new subscriber services into a telecommunications network. More specifically, the invention provides for storing programming code, which implements a particular subscriber service, on a card containing a magnetic storage medium and downloading the programming code from the card into an established network. The downloaded programming code is then operated on by the inherent processing capability of the network to provide the particular service to the subscriber.

Currently, when new subscriber services are to be introduced into a provider network, significant programming modifications are required to be made to the network. The network must be provisioned before the services can be provided to the subscriber. Thus, this requirement to modify the network infrastructure significantly reduces the service provider's capability to rapidly introduce new subscriber services. The new services are not able to be provided real-time by the network upon the demand of the subscriber, but rather are only able to be provided after substantial provisioning of the network.

Additionally, the service provider's ability to customize the currently available services that are provided on the network, to meet specific subscriber desires, is greatly diminished by the requirement to modify the network's infrastructure in order to customize a service.

A currently known method for providing new services to consumers is to provide the consumer with a "smart card". However, this method presents drawbacks. A smart card, which is essentially a processing device, is provided to the subscriber. However, because the smart card requires its own microprocessor and memory, producing the card and implementing the new service can be an expensive and complex undertaking.

An additional known method of providing a network subscriber service to a subscriber is to provide the subscriber with a "dumb" card that contains a computer readable magnetic stripe on which is stored data related to the subscriber and the particular service. The data stored on the stripe is input into the network by swiping the card through a card reader. The data is then processed by the network. Whereas the data on the card may be modified relatively quickly by the service provider, the programming code required to process the data is resident in the provider network and thus any modification of the code itself still requires complex reconfiguring of the network. Again, the network must be provisioned well before the service is made available to the subscriber. Therefore, with this method of providing services to a subscriber, the data utilized by the service may be modified in a timely manner, however, the service itself is not able to be implemented or modified without requiring extensive reconfiguring of the provider network.

Therefore, it would be desirable to provide an apparatus and method for rapidly creating new subscriber services in a network and for providing for real time provisioning of the network when implementing the new subscriber services.

SUMMARY OF THE INVENTION

An apparatus and method for providing subscriber services in a telecommunications network is provided. A portable subscriber services card is provided for implementing and modifying services in a telecommunications network. The subscriber services card includes a magnetic storage medium on a portion of the card. Stored on the magnetic medium is data associated with the subscriber and the service to be provided and programming code. The programming code implements the particular subscriber service. A network interface is provided to download the data and programming code stored on the subscriber services card to the telecommunications network. The data and code are downloaded by the network interface to the network when the subscriber inserts the services card into the network interface during call (session) initiation with the telecommunications network. The data and code that are downloaded to the network are stored in memory in the network and are utilized by the network's processor. The network's processor applies the code to the data to provide the particular service to the subscriber. Therefore, the network processor knows the boundary between the data and the code.

In this manner, subscriber services can be rapidly introduced into a telecommunications network by a service provider without requiring reconfiguration of the telecommunications network. The network merely implements the code downloaded to it by the subscriber by utilizing the network's processing capability. The network then provides the particular service to the subscriber, as implemented by the downloaded programming code, by utilizing the network's currently existing capabilities.

DETAILED DESCRIPTION

Figure 1:
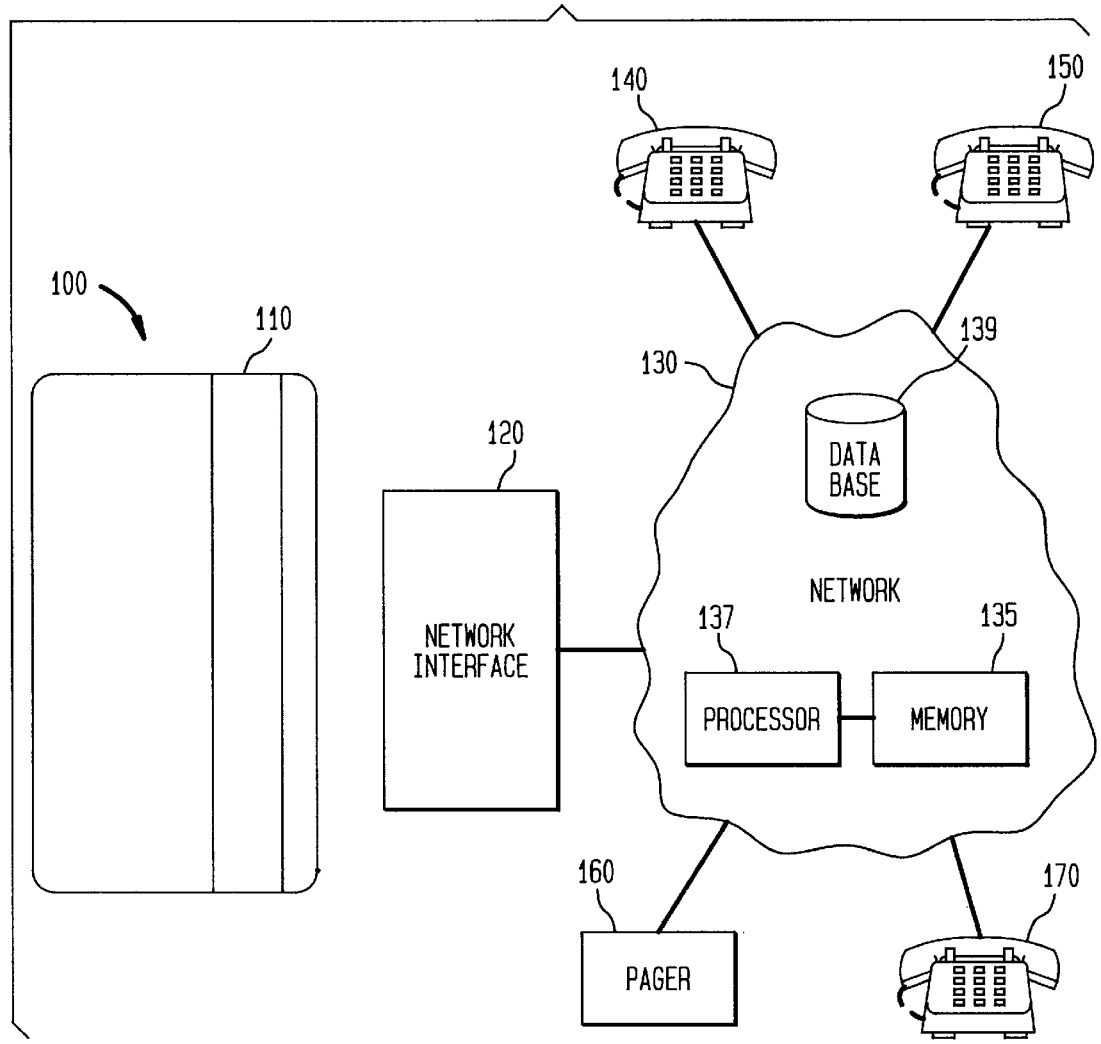
FIG. 1 illustrates the apparatus of the present invention for providing network subscriber services.

FIG. 1 illustrates one embodiment for the components of the present invention for providing network subscriber services in a telecommunications network. As shown, a subscriber services card 100, a network interface 120, and a telecommunications network 130 is provided. Telecommunications network 130 provides interconnection of, in the present example, the home phone 140 of the subscriber, the work location phone 150 of the subscriber, a pager 160 for the subscriber, and the car phone 170 of the subscriber.

Subscriber services card 100 is disclosed as a standardized 2 inch by 3¼ inch plastic card. This standard size card is commonly known and is utilized for credit cards, bank cards, etc. The subscriber services card is not required to be configured to these standardized dimensions, however, the use of this standard size will add to the convenience of the user since the card can be easily stored in items that are designed to accommodate this size card, e.g., a wallet. Included on subscriber services card 100 is magnetic storage medium 110. This storage medium is disclosed as a magnetic stripe, which also is commonly utilized for credit cards, etc. Again, the magnetic storage medium is not required to be configured as a magnetic stripe, but rather, can be of any size or shape and can be located in any suitable position on card 100. The only requirement for the size and shape of card 100 and magnetic storage medium 110 is that they be able to store on them the program code that implements a particular subscriber service and that they be compatible with network interface 120, which will be described later in this specification.

Stored on magnetic storage medium 110 is data that is related to the particular subscriber, or user, and programming code that implements a particular subscriber service. The data that is related to the particular subscriber can be personal information such as name, address, account number, etc. The data can be formatted in any format, e.g., a commonly known format or a proprietary format. The data that is stored on card 100 is analogous to the type of data that is commonly stored on bank cards, or automated teller machine (ATM) cards, in that the data provides information to a network about the user.

Programming code is also stored on card 100. The code contains all of the commands required to implement a particular service and to access and utilize data related to the service and the subscriber. The code is analogous in concept to the programming code utilized to encode any computer application program. The specific format and content of the code itself is not critical to the present invention. A variety of code formats and contents can be implemented without departing from the spirit and scope of the invention. The only requirement for the code's format is that it be compatible with, e.g., capable of being processed by, the processors in the telecommunications network, which will be discussed later. With respect to the content of the code, the content is determined by the particular service that is to be implemented by the code. Each different type of service to be implemented would require different programming code. The code can be written so that it introduces a new subscriber service or can serve to modify, or customize, a currently available subscriber service in the network to meet the specific requirements of a particular subscriber.

The code and data are stored on the card through means that are well known in the art. The code and data can be provided by the specific telecommunications network service provider in order to implement a particular service of the service provider or can be provided by a source independent of the network service provider. In the case where a source other than the service provider is providing code and data to implement a particular service, the independent source would format the code and data to be compatible with the network of a particular network service provider. In this manner, an independent source can implement a new service without requiring that the independent source have its own network. The independent source would contract with the network provider for use of the network provider's telecommunications network for implementing the service that is provided by the independent source.

The code and data stored on card 100 are downloaded to network 130 during session initiation with the network by utilizing network interface 120. Network interface 120 is any type of device well known in the art that is able to read the data and code stored on the magnetic storage medium and download the data and code to network 130. The network interface can be designed such that the subscriber swipes card 100 through the interface or such that the subscriber inserts the card into the interface. Either of these two methods, or any number of alternative methods, are possible implementations. The only requirement is that network interface 120 read the data and code stored on the magnetic storage medium and download the information read from the card to network 130.

Once the programming code and the data stored on the magnetic storage medium of card 100 are downloaded to network 130, network 130 stores the code and data in memory 135 and processes the code and data by utilizing the processing capabilities, e.g., processor 137, of the network. The processing capabilities of network 130 are the only processing capabilities required to implement the present invention. There is no processing capability or processor memory available on card 100. The programming code and data are downloaded to memory 135 and processed by the network's processor 137 to implement the particular subscriber service that is embodied in the code.

As stated previously, the inherent processing capability of the network is utilized to process the code and data in implementing the new subscriber service. Additionally, the network's assets are used to implement the new service. For example, the telecommunication network's transmission equipment, switches, and transmission lines would be utilized in providing the service. The programming code and data that are downloaded to the network, and processed by the network, would direct that these assets be utilized in a particular way to implement the particular new service.

In this manner, the network infrastructure would not be required to be modified in implementing the new service. Rather, the established infrastructure would operate on the newly introduced program to implement the new service, similar to the way that a personal computer's (PC) operating system is able to process a new application program that is loaded to the computer. The PC's operating system is not modified when implementing the new application program nor is any peripheral equipment that is connected to the computer (e.g., printer, monitor, etc.) modified when implementing the new program. In the PC example, the peripheral equipment of the PC is utilized as directed by the new application program, as are the telecommunication network's assets when practicing the present invention. In this manner, a telecommunications service provider is able to rapidly introduce new subscriber services into the provider network without requiring reconfiguration of the network.

Figure 2:
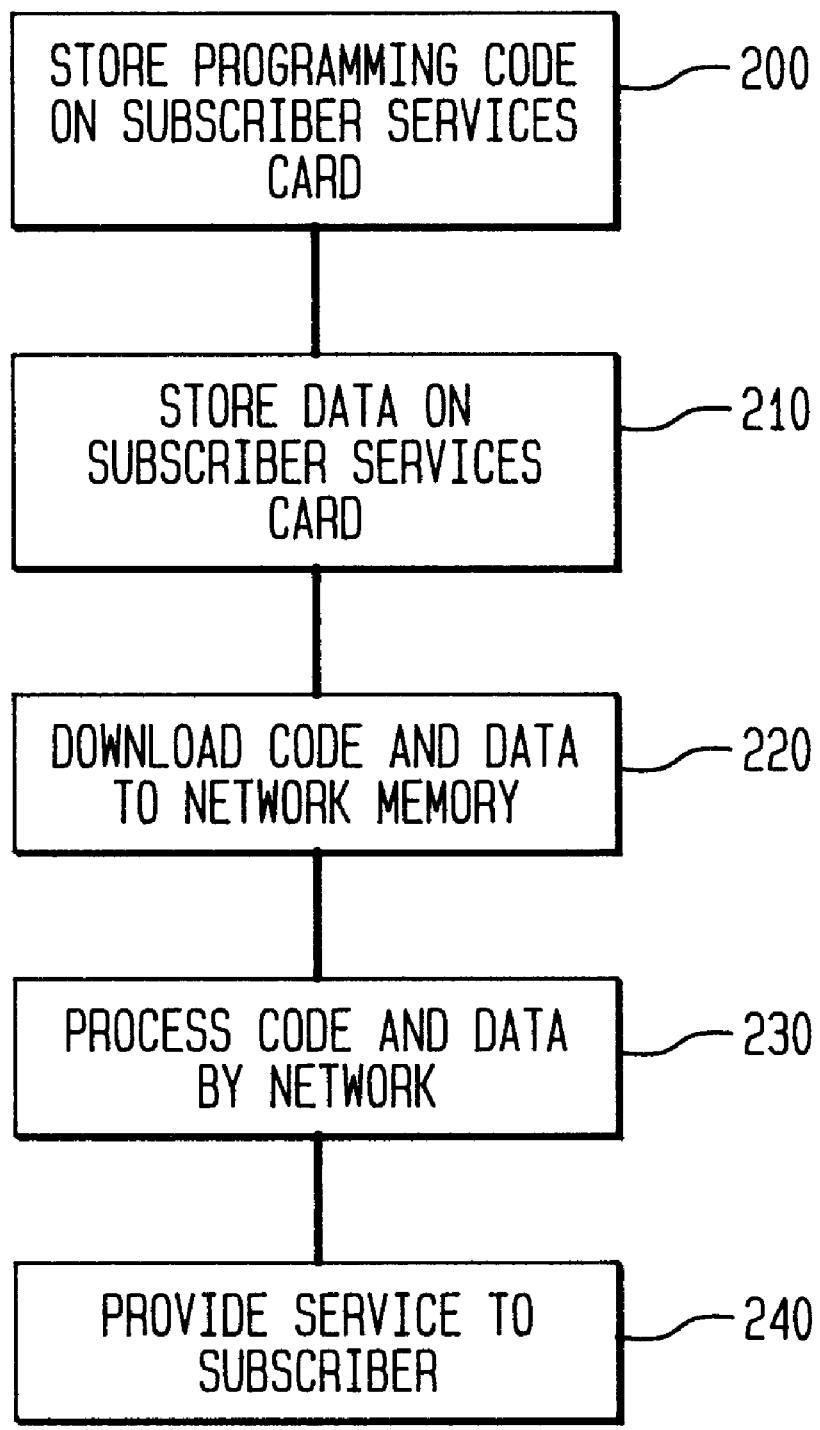
FIG. 2 illustrates a process flow chart for providing network subscriber services in accordance with the present invention.

The flow chart of FIG. 2 describes the process of implementing new subscriber services in accordance with the present invention. Step 200 represents the step of storing programming code on the magnetic storage medium of a subscriber services card in order to implement a new subscriber service or modify an existing service. The programming code includes all commands required to implement the new service or modify the existing service. Step 210 shows the step of storing data on the magnetic storage medium of a subscriber services card. The data is representative of information related to the subscriber or the particular service and is acted upon by the programming code when implementing the subscriber service. Step 220 illustrates the step of downloading the programming code and data stored on the subscriber services card to the network and storing the code and data in the memory of the network. The code and data are downloaded to the network by a network interface. The network interface is able to read the magnetic storage medium. Step 230 shows the step of processing the code and data that are downloaded to the network by utilizing the inherent processing capability of the network. Step 240 represents the step of providing the particular subscriber service that is embodied in the programming code to the subscriber by utilizing the assets of the telecommunications service provider.

In operation, an example of a particular subscriber service that can be implemented by utilizing the present invention is a service designed for a child for contacting a parent at various phone numbers in the event of an emergency. If the child is not familiar with the various locations where the parent can be located, or the phone numbers for the parent at the various locations, the service could provide that the network attempt to contact the parent at the various locations, with the particular locations being called in a specified sequence. For example, upon downloading of the programming code and data to the network, the network would first call the work phone 150 of the parent. If the call was not completed, the network would then attempt to contact the parent at the parent's car phone 170. Again, if the call was not answered, the network would automatically attempt to call the parent's pager 160. The phone numbers for these locations would be provided as data stored on the subscriber services card. In this manner, the network would provide a particular new service to a subscriber by processing programming code and data which would direct the network to attempt to place a call to a called party in a specific sequence.

Several variations on the disclosed embodiments are contemplated. In the disclosed embodiments, data concerning the subscriber is stored on card 100. However, it is not required that data be stored on the card. The subscriber, during session initiation, can provide data related to the subscriber to the network by any of several alternative means. For example, the subscriber can enter information into the telecommunications network by utilizing the telephone keypad or by speaking into the telephone and having this speech recognized by the network by utilizing speech recognition software. Additionally, the subscriber does not need to enter all data at session initiation. If the subscriber is a present or past subscriber to the network, data related to the subscriber may have been previously stored in the network in database 139 and be accessed by the programming code when providing a particular service.

In the disclosed embodiment, the provider network is described as a telecommunications network, however, the present invention can be practiced in any type of service provider network. For example, the present invention could be utilized with a data network, an integrated services network, e.g., the Internet, or a financial services network to implement new services or modify existing services on the network.

Additionally, the subscriber services card is disclosed as a standardized 2 inch by 3¼ inch plastic card that contains a magnetic stripe for storing programming code on the card. However, a card with this type of magnetic storage medium is not required. Any type of storage medium capable of storing programming code for downloading to a network may be utilized with the present invention. For example, a compact disk or optical disk could be utilized as storage mediums for the programming code.

The present invention is also not limited to providing only a single service on each subscriber services card. Multiple services could be programmed onto each card and each service could be downloaded to the subscriber services network when the card is read by the network interface. The subscriber could select the particular service that they desire at that time, from among the multiple services that are downloaded to the subscriber services network, during call set-up. For example, the programming code that is required to implement the services could also provide for allowing the subscriber to select that particular service. The subscriber could select the service to be provided by inputting their selection to the subscriber services network by utilizing a voice recognition system in the network or by having the network provide function keys at the network interface, e.g., the telephone keypad of the subscriber could be utilized to input the selection of the subscriber into the network. The multiple services could be provided by either an independent source or the network service provider. For example, an independent source could contract with the network service provider to provide for implementing multiple services on any particular subscriber services card.

The disclosure refers to providing a "subscriber" service in a network, however, it is not required that the actual user of the service be a present subscriber to the network. The user can be either a present subscriber to the network or a person that has not previously been, or is not currently, a network "subscriber". The network services that can be implemented by practicing the present invention can be utilized by any individual.

As described above, an apparatus and method for providing network subscriber services is provided. The disclosed embodiments are illustrative of the various ways in which the present invention may be practiced. Other embodiments can be implemented by those skilled in the art without departing from the spirit and scope of the present invention.

What is claimed is:

1. A method for implementing subscriber services in a service provider network comprising the steps of:

storing programming code on a portable storage medium prior to session initiation with said service provider network by a subscriber, said programming code including all code required to implement a new or modified subscriber service;

downloading said programming code to said service provider network by the subscriber at session initiation with said service provider network by the subscriber;

processing said programming code by said service provider network; and providing said subscriber service to the subscriber by processing said programming code.

2. The method for implementing subscriber services in a service provider network of claim 1 wherein said network is a telecommunications network.

3. The method for implementing subscriber services in a service provider network of claim 1 wherein said network is a data network.

4. The method for implementing subscriber services in a service provider network of claim 1 wherein said network is an integrated services network.

5. The method for implementing subscriber services in a service provider network of claim 1 wherein said storage medium is a magnetic storage medium.

6. The method for implementing subscriber services in a service provider network of claim 5 wherein said portable magnetic storage medium is a standardized 2 inch by 3¼ inch plastic card including a magnetic stripe.

7. The method for implementing subscriber services in a service provider network of claim 1 wherein said storage medium is a compact disk.

8. The method for implementing subscriber services in a service provider network of claim 1 wherein said storage medium is an optical disk.

9. The method for implementing subscriber services in a service provider network of claim 1 wherein said programming code modifies said subscriber service provided by said service provider network such that said subscriber service is customized for a particular subscriber.

10. The method for implementing subscriber services in a service provider network of claim 1 further comprising the steps of:

storing data related to the subscriber on said storage medium;

downloading said data to said service provider network at session initiation with said service provider network by the subscriber;

processing said data by said service provider network; and providing said subscriber service to the subscriber by processing said programming code and said data.

11. A method for implementing a subscriber service in a telecommunications network comprising the steps of:

storing programming code on a portable card including a magnetic storage element prior to session initiation with said telecommunications network by a subscriber, said programming code including all code required to implement the subscriber service;

downloading said stored programming code to said telecommunications network by the subscriber at session initiation with said telecommunications network by the subscriber without requiring a request prompt when said card is read by a network interface;

processing said programming code by said telecommunications network;

accessing data associated with the subscriber and stored in a database resident in said telecommunications network by said network; and providing the subscriber service to the subscriber by the telecommunications network by processing said programming code and said accessed data.

12. The method for implementing a subscriber service in a telecommunications network of claim 11 further comprising the steps of:

storing data related to the subscriber on said portable card; and downloading said stored data to said database resident in said telecommunications network at session initiation with said telecommunications network by the subscriber.

13. An apparatus for introducing subscriber services into a service provider network comprising:

a portable service subscriber card, said subscriber card including a storage medium wherein said storage medium stores subscriber unique programming code and data, wherein both of said programming code and said data is only related to a particular subscriber for implementing a new subscriber service which is only applicable to the particular subscriber, said programming code and data stored on said service subscriber card prior to session initiation with said service provider network by the subscriber and including the entirety of all information required by said service provider network for implementing the new subscriber service.

14. The apparatus for introducing subscriber services into a service provider network of claim 13 wherein said service subscriber card is a standardized 2 inch by 3¼ inch plastic card and wherein said storage medium is a magnetic stripe included on a portion of said card.

15. A method for implementing subscriber services in a subscriber services network comprising the steps of:

storing programming code on a portable card including a magnetic storage element by a first service provider, said programming code including all code required to implement the subscriber service on a second service provider's network, said first service provider separate from said second service provider;

formatting said stored programming code by said first service provider into a format processable by said second service provider's network;

downloading said formatted stored programming code to said second service provider's network by a subscriber at session initiation with said second service provider's network by the subscriber when said card is read by a network interface;

processing said programming code by said second service provider's network;

providing data associated with the subscriber to said second service provider's network at session initiation with said second service provider's network by the subscriber, said data provided to said second service provider's network by the subscriber by the subscriber speaking said data into said second service provider's network and said second service provider's network interpreting said data by utilizing voice recognition software; and providing a subscriber service to the subscriber by said second service provider's network by processing said programming code and said data.

\* \* \* \* \*